United States Patent [19]

Kibler

[11] 3,736,802
[45] June 5, 1973

[54] APPARATUS FOR OBTAINING A CONTROLLED RECTILINEAR MOVEMENT OF A ROTATABLY DRIVEN ACTUATOR MEMBER

[75] Inventor: Willis L. Kibler, Detroit, Mich.

[73] Assignee: McCord Corporation, Detroit, Mich.

[22] Filed: Apr. 20, 1971

[21] Appl. No.: 113,222

Related U.S. Application Data

[63] Continuation of Ser. No. 887,168, Dec. 22, 1969, abandoned.

[52] U.S. Cl..........74/89.15, 74/424.8 A, 192/105 C
[51] Int. Cl..............................................F16h 27/02
[58] Field of Search..................74/89.15, 424.8 A, 74/105 CS, 105 C, 103 A, 89 R; 192/105 C; 137/49, 53

[56] References Cited

UNITED STATES PATENTS

| 2,346,728 | 4/1944 | Carlson | 74/424.8 A |
|---|---|---|---|
| 1,122,206 | 12/1914 | Jennings | 192/105 CS |
| 1,710,694 | 4/1929 | Ferenci | 192/103 A |
| 2,694,320 | 11/1954 | Kron | 192/105 C |
| 3,162,073 | 12/1964 | Farekas | 74/424.8 A |
| 1,136,940 | 4/1915 | Craft | 137/49 |
| 1,268,264 | 6/1918 | Murray | 74/424.8 |
| 1,509,683 | 9/1924 | Miller | 192/105 |
| 2,491,543 | 12/1949 | Alfonso | 74/424.8 |

FOREIGN PATENTS OR APPLICATIONS

| 661,917 | 3/1929 | France | 192/105 CS |

Primary Examiner—Charles J. Myhre
Assistant Examiner—Wesley S. Ratliff, Jr.
Attorney—McGlynn, Reising, Milton & Ethington

[57] ABSTRACT

The actuator member of the apparatus is supported for axial movement relative to a reversible rotatable drive member and is locked against rotational movement relative to the drive member. A centrifugally actuated clutch unit on the drive member has separable half nut sections, which when the drive member is rotated, are movable together to form a split nut for engaging a screw section on the actuator member. On axial movement of the actuator member in either direction the split nut overruns the screw section, but is yieldably held in an abutting relation with the screw section for threaded engagement therewith on a reversed rotation of the drive member. When the drive member is stationary and the split nut disengaged from the screw section, the actuator member is yieldably supported for manual movement axially of the drive member through a predetermined distance to maintain at least one end of the screw section in a position to engage the split nut on rotation of the drive member.

10 Claims, 10 Drawing Figures

PATENTED JUN 5 1973 3,736,802

INVENTOR.
WILLIS L. KIBLER
BY
ATTORNEY

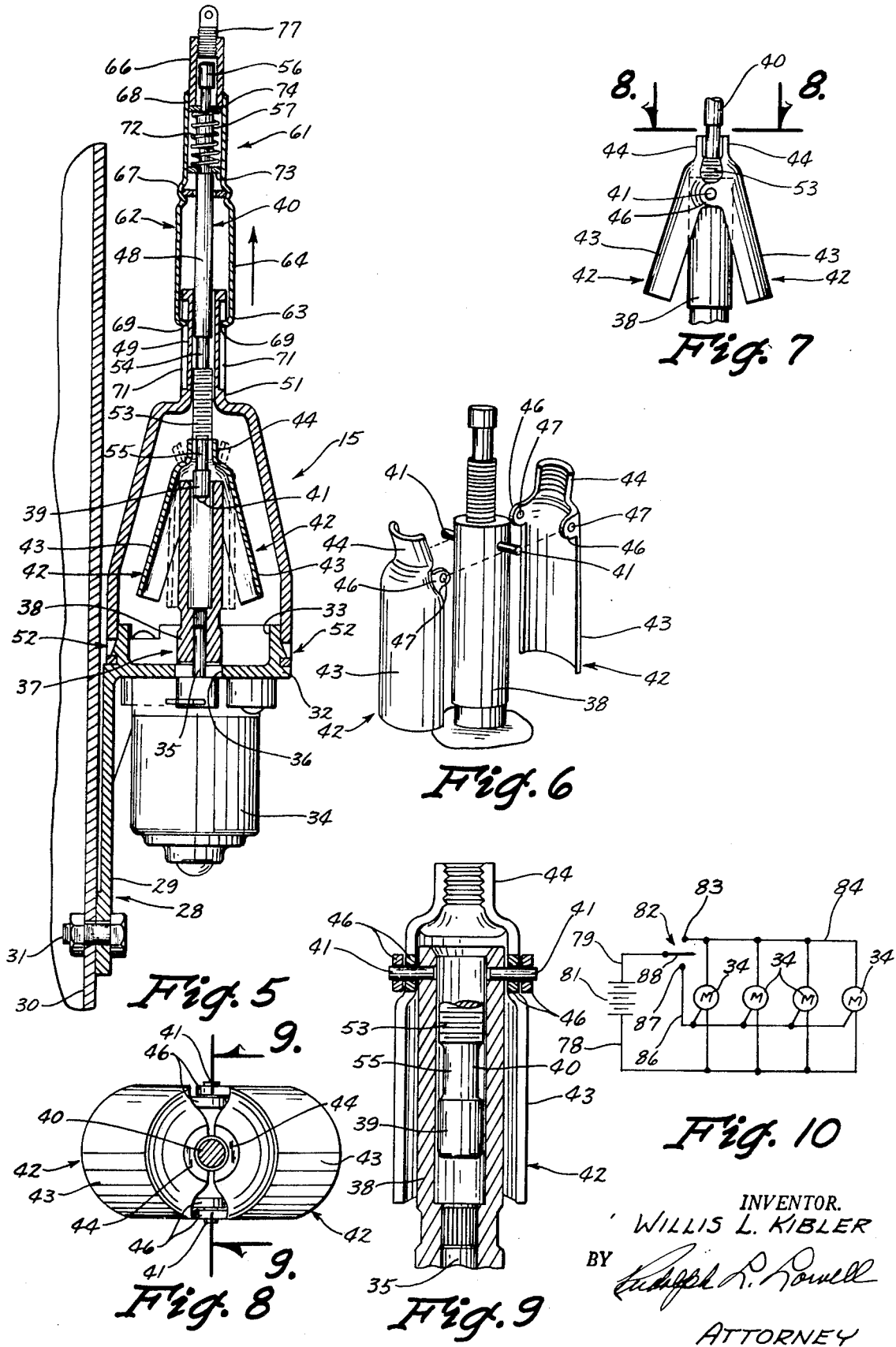

3,736,802

APPARATUS FOR OBTAINING A CONTROLLED RECTILINEAR MOVEMENT OF A ROTATABLY DRIVEN ACTUATOR MEMBER

This application is a continuation of application Ser. No. 887,168, filed Dec. 22, 1969, now abandoned.

SUMMARY OF THE INVENTION

The apparatus of this invention is compact, economical and capable of being readily installed within limited space requirements, such as a vehicle door, to actuate a door lock. The rectilinearly movable actuator member has a reciprocal movement controlled through a predetermined distance, and within such distance it can be electrically reciprocated or manually reciprocated; or it can be electrically moved in one direction and manually moved in an opposite direction. A driven connection of the actuator member is automatically and positively made in response to the operation of its reversible driving member, and the actuator member is released for a manual operation whenever the operation of the driving member is discontinued.

BRIEF DESCRIPTION OF THE DRAWINGS

FIG. 5 is illustrated similarly to FIG. 4 and shows the actuator member in an outermost moved position;

FIG. 6 is an exploded perspective view of a centrifugally actuated clutch unit that forms part of the apparatus;

FIG. 7 is a side elevational view of the clutch unit shown in FIG. 6;

FIG. 8 is an enlarged sectional detail view as seen along the line 8 — 8 in FIG. 7;

FIG. 9 is a sectional view on line 9 — 9 in FIG. 8; and

FIG. 10 is a diagrammatic electrical control circuit which may be used with the apparatus of this invention.

DETAIL DESCRIPTION OF THE INVENTION

Figure 1:
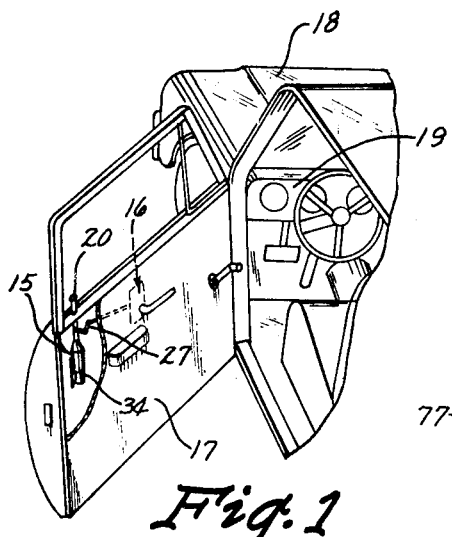
FIG. 1 is a fragmentary perspective view of an automobile body showing the apparatus of this invention in assembly relation with a door lock latching mechanism.
Figure 2:
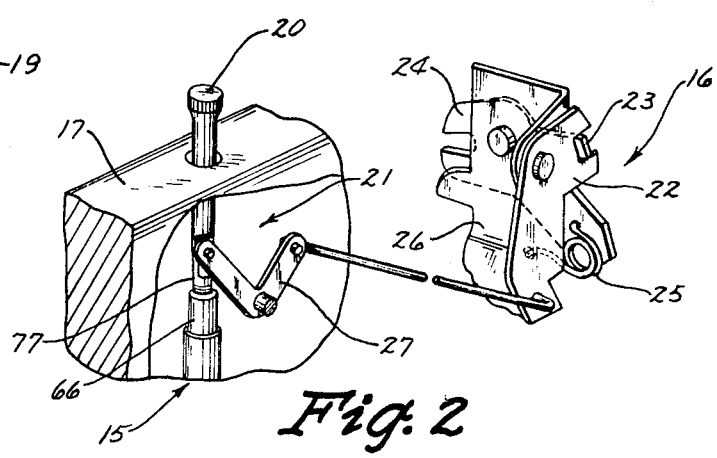
FIG. 2 is a fragmentary perspective view of a portion of the assembly in FIG. 1 showing the connection of the apparatus with the garnish button of the door latching mechanism.

Referring to FIG. 1 of the drawings the apparatus of this invention, designated generally as 15, is illustrated in an assembly relation with a latch mechanism 16 for the door 17 of a vehicle body 18 which also includes an instrument panel 19. The latch mechanism 16 includes a usual garnish button 20 for actuating a shiftable rod and lever arrangement 21 to pivotally move an operating lever 22 to door locking and unlocking positions. As shown in FIG. 2 the lever 22 straddles a foot or leg 23 on a pivoted locking lever 24 which is selectively and alternately held in either a door locking or unlocking position by an overcenter type coil torsion spring 25 that is hooked between the locking lever 24 and a mounting plate 26 for the levers 22 and 24. For a more detail description of the latch mechanism 16 reference is made to U.S. Pat. No. 3,423,117.

The apparatus 15 (FIG. 2) is attached to the assembly 21 by a connector member 27 to provide for an electrical operation of the latch mechanism 16. As will become apparent the door lock or garnish button 20 may be manually moved in a normal manner to either a door opening or door locking position whenever the apparatus 15 is de-activated. Conversely, regardless of the manually moved position of the door lock button 20, the apparatus 15, on being activated, immediately takes over to move the button 20 from such manually moved position to the other position therefor.

Figure 3:
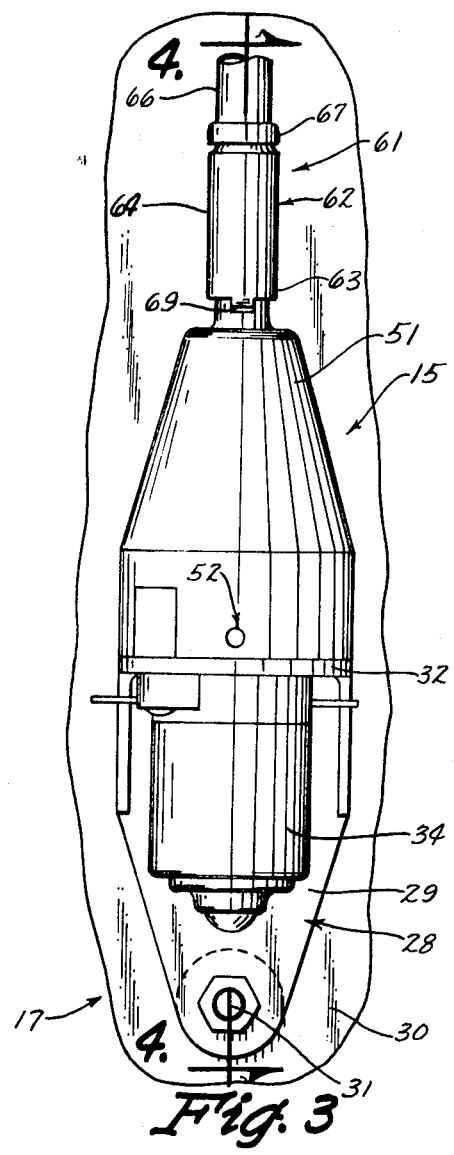
FIG. 3 is an enlarged side view of the apparatus.
Figure 4:
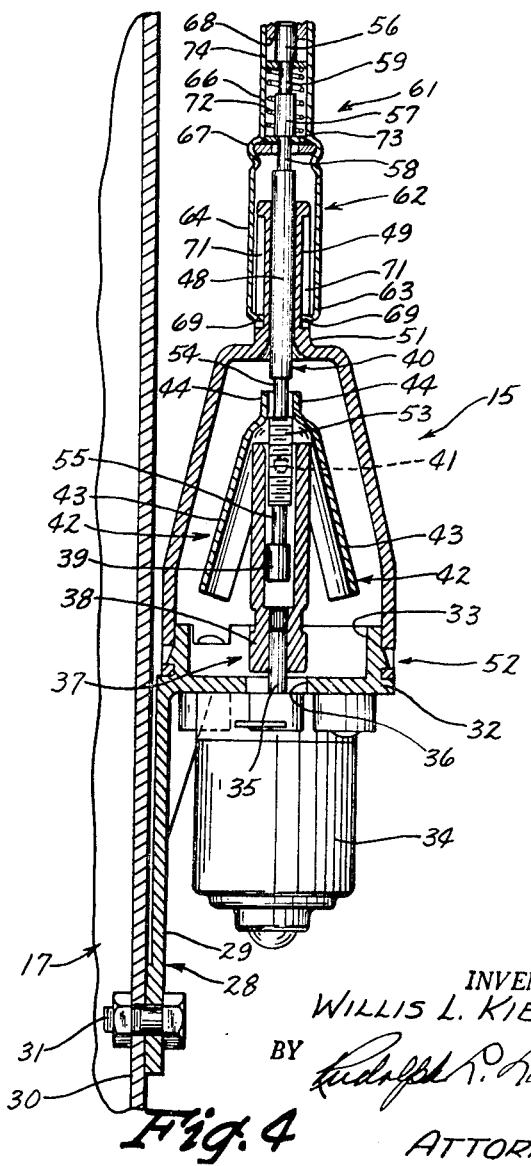
FIG. 4 is a longitudinal sectional view taken along the line 4 — 4 of FIG. 3 showing the actuator member of the apparatus in an innermost moved position.

The apparatus 15 (FIGS. 3 and 4) includes a mounting bracket 28 of a right angle shape having an upright leg 29 secured to a door frame member 30 as by a bolt 31 and a horizontal leg 32 of a circular shape in plan view provided with an upwardly projected peripheral wall 33. A reversible electric motor 34 attached to the underside of the horizontal leg 32 has a drive shaft one end section 35 of which extends upwardly through a central opening 36 formed in the horizontal leg 32. Mounted about the shaft end section 35 and in splined driven engagement therewith, as indicated at 37, is a tubular sleeve 38. As shown in FIG. 4, the sleeve 38 projects upwardly from and in coaxial alignment with the shaft end section 35 so as to form a guide bearing for the lower end 39 of an actuator member or rod 40.

Adjacent its upper end (FIGS. 6 and 7) the sleeve 38 carries a pair of radially projected diametrically opposite pivot pins 41 for pivotally supporting a pair of centrifugally actuated weight members 42. Each weight member 42 has a body section 43 of a semicircular shape in transverse cross section integrally formed with an upstanding neck section 44 that is also of a semicircular shape in transverse cross section. Each neck section 44 is internally threaded so as to form a half nut member.

At the junction of a neck section 44 and with the body section 43 each weight member 42 has a pair of transversely opposite laterally extended arms 46 formed at their free ends with openings 47. The arms 46 are supported at the openings 47 on the pivot pins 41 (FIG. 9). When the sleeve member 38 is not being rotated the weight members 42 are suspended from the pivot pins 41 with the body sections 43 hung vertically downwardly in a concentrically spaced relation about the guide sleeve 38 and the neck sections 44 projected upwardly in a diverged relation from opposite the sides of the actuator member 40, all as shown in dotted lines in FIG. 5.

On rotation of the tubular guide sleeve 38 the body sections 43, in response to centrifugal action, are swung outwardly into a downwardly diverged relation from the pivot pins 41, (FIGS. 5 and 8) whereby the neck sections 44 are moved inwardly toward each other into a mating relation to form a split nut that is extended about and in coaxial alignment with the actuator rod 40. As illustrated in FIGS. 4 and 5, the actuator rod 40 has a central section 48 that is guidably supported for reciprocal movement within a tubular bearing 49 projected upwardly from and integrally formed with a housing or casing 51 for the weight members 42 and sleeve 38. The housing 51 is of a generally frustoconical shape, with its lower end positioned about and in a snap-lock engagement, as indicated at 52, with the peripheral wall 33 of the mounting bracket 28.

Intermediate the central section 48 and lower section 39 of the actuator rod 40, the rod is formed with a shaft section 53 which is separated from the lower section 39 and central section 48 by reduced rod portions 54 and 55, respectively. Stated otherwise, the shaft section 53 is defined by the reduced rod sections 54 and 55, to provide a shaft section of a predetermined length relative to the reciprocal path of travel of the door button 20 from a door locking position to a door opening position.

Intermediate the upper end section 56 and the central section 48 of the actuator rod 40 is what will be referred to as an abutment section 57 which is separated from the central section 48 and upper section 56 by reduced rod portions 58 and 59, respectively. Referring to FIGS. 4 and 5, it is seen that the central section 48 is extendible outwardly or upwardly from the tubular bearing 49 so that the portion of the rod 40 located between the upper section 56 and the central section 48 is always exposed above the bearing member 49. This exposed portion of the rod 40 forms part of a conversion unit, indicated generally as 61, that provides for a manual or electrical operation of the apparatus 15 at the will of the operator.

This conversion unit 61 includes additionally a tubular housing or connecting member 62 that has a lower section 63, an intermediate section 64 and an upper section 66 of progressively reduced diameters to form shoulders 67 and 68 at the junction of the center section 64 with the lower section 63 and upper section 66, respectively. The lower section 63 is movable in a telescopic relation about and relative to the tubular member 49 and is formed at its bottom end with a pair of inwardly projected diametrically opposite lugs or keys 69 that are guidably movable within corresponding grooves or ways 71 extended longitudinally of and formed in the outer peripheral surface of the bearing member 49.

Mounted about the rod abutment section 57 is a coil spring 72 that is compressible between washers 73 and 74 movably mounted about the reduced rod sections 58 and 59 and engageable with the shoulders 67 and 68, all respectively. The spring 72 and the abutment section 57 are thus always located within the center section 64 of the tubular connecting member 62. The upper end of the top section 66 of the connecting member 62 is internally threaded, as indicated at 76, for threaded engagement with a connecting link 77 (FIG. 2) that is operatively connected with the door lock button 20 and the rod and lever arrangement 21 for actuating the latch mechanism 16.

In the use of the apparatus 15, let it be assumed that the door lock button 20 is in its door opening position and the motor 34 de-energized as illustrated in FIG. 5 so that the weight members 42 are in their dotted line positions. The actuator rod 40 is thus in its uppermost moved position with the connecting member 62 extended from the bearing member 49. It will also be seen that the washer 74 has been moved into engagement with the shoulder 68 by the abutment rod section 57 and that the washer 73 has been moved out of engagement with the shoulder 67 by the central section 48. The spring 72 thus exerts a slight downward yieldable pressure tending to move the actuator rod 40 downwardly to a position wherein the lower end of the threaded shaft section 53 can be engaged by the nut half portions 44 on movement inwardly toward each other. Thus, on energization of the motor 34 to move the button 20 downwardly to a door locking position, the shaft section 53 is immediately engaged by the rotating nut portions 44 to move the rod 40 downwardly to its position shown in FIG. 4. The weight members 42 and sleeve 38 thus constitute a centrifugally actuated clutch unit for connecting the actuator rod 40 in a driven relation with the motor 34.

During the initial downward movement of the actuator rod 40, the action of the spring 72 to move the rod 40 downwardly is retained until the washer 78 abuts the shoulder 67. With the washers 73 and 74 against the shoulders 67 and 68, respectively, the spring 72 is in its most fully extended and neutral position. In such neutral position, the spring is without any action on the actuator rod 40. This non-action of the spring 72 takes place by virtue of the relative slidable movement of the washers 73 and 74 on the reduced rod sections 58 and 59, respectively. On a continued downward movement of the actuator rod 40 the lower face of the abutment section 57 moves into engagement with the washer 73, which as stated above is in abutting engagement with the shoulder 67. When this engagement takes place the rod 40 and the tubular housing 51 are moved downwardly as a unit. Concurrently with the abutment of the section 57 with the washer 73 to move the housing 51 downwardly the upper face of the abutment section 57 is moved away from the washer 74 by the engagement of the washer 74 with the downwardly moving upper rod section 56 as seen in FIG. 4.

As a result of this engagement of the washer 74 by the upper rod section 56 the spring 72 acts to apply a yieldable pressure upwardly on the actuator rod 40. Thus when the split nut that is comprised of the nut half portions 44 overruns the upper end of the threaded shaft section 53, such upper end is maintained in riding engagement against the split nut whereby to eliminate any lost motion or rattling between the split nut and the shaft 53 while the motor 34 is running. On shutting off of the motor 34 the weight members 42 are moved by the action of gravity to their suspended positions from the pivot pins 41 and out of engagement with the rod 40 which is held in its door lock position of FIG. 4 by the toggle action of the spring 25 in the door latching mechanism 16.

To unlock the vehicle door 17 the motor 34 is operated to move the split nut portions 44 into engagement with the lower end of the shaft section 53. By virtue of the reversed rotation of the rod 40 relative to its rotation for locking the vehicle door, rod 40 is linearly moved upwardly to its position of FIG. 5. During this upward movement of the actuator rod 40 the casing 51 is moved upwardly when the washer 74 and the upper face of the abutment section 57 are moved against the shoulder 68.

Since the action of the spring 72, during the upward movement of the actuator rod 40, is reversed relative to its action when the rod 40 is being moved downwardly, the lower end of the shaft section 53 is continuously biased into riding engagement with the split nut on the weight members 42 to prevent any rattling therebetween while the motor 34 is running. Also, it will be noted that on stopping of the motor 34 and the moving of the weight members 42 by gravity to their suspended positions from the pivot pins 41 that the actuator rod will be held in a vehicle door unlocking position by the toggle action of the spring 25 in the latch mechanism 16.

If the door lock button 20 is to be manually moved to a door locking position, from its unlocking position shown in FIG. 5, such is done by merely depressing the button 20 in the usual manner. On depression of the button 20 the connecting member 62 is moved downwardly to in turn move the actuator rod 40 from its position shown in FIG. 5 to the position therefor shown in FIG. 4 wherein the split nut portions 44 are located adjacent the upper end of the threaded shaft section 53 and opposite the reduced rod section 55. Thus, the relative positions of the apparatus 15 following this manual movement is in all respects the same as shown in FIG. 4 when the like movement of the rod 40 was accomplished by operation of the motor 34.

Similarly, when the actuator rod 40 is in its door locking position shown in FIG. 4, it is manually movable independently of the motor 34 to a door unlocking position by pulling upwardly on the door lock button 20 in a usual manner. During this manual operation of the button 20 to either lock or release the vehicle door 17, it will be seen that the half nut portions 44 are always located opposite one or the other of the reduced rod sections 54 and 55 so as to be engageable with the rod shaft section 53 to electrically operate the rod 40 in a reversed direction relative to the last direction of movement thereof.

FIG. 10 illustrates diagrammatically an electrical control system for simultaneously operating the motors 34 when an apparatus 15 is associated with a latch mechanism 16 on each of the four doors of a vehicle body. The motors 34 are connected in parallel between the leads 78 and 79 of a usual vehicle battery 81. The lead 79 is connected to a three-way switch 82 that may be carried on the instrument panel 19. A first feed line 83 from the switch terminal 84 is connected to one side of the windings (not shown) of the motors 34 to rotate the motors in a first direction. As is usual a second feed line 86 from the switch terminal 87 connects the opposite side of the motor windings to lead line 78 to reverse the current flow through the windings to provide for a reversed rotation of the motors 34. The switch actuator 88 is shown in FIG. 10 in its off position.

I claim:

1. Apparatus for obtaining controlled rectilinear movement comprising:
   a. a reversible rotary driving member,
   b. a driven member,
   c. means supporting said driven member for reversible movement axially of said driving member,
   d. an intermediate centrifugally actuated member,
   e. means supporting said centrifugally actuated member on said driving member for pivoted movement about an axis extended diametrically of said driving member,
   f. coacting portions on said intermediate member and said driven member forming a nut and a screw having ends for releasably connecting said driving member with said driven member when said driving member is rotated, and
   g. means for yieldably maintaining the nut portion of said driven member engageable with one or the other of the ends of the screw after the nut portion has overrun the screw portion.

2. The apparatus according to claim 1 including:
   a. means interconnecting said yieldable means with said driven member to provide for a delayed concurrent movement of said yieldable means with the driven member in either direction of movement thereof,
   b. said driven member, when the centrifugally activated member is disconnected therefrom, being manually movable in reversed directions.

3. An apparatus for providing a controlled rectilinear movement of a rotatably driven actuator member comprising:
   a. a support member,
   b. a reversible electric motor mounted on said support member having a drive shaft,
   c. a sleeve member coaxial with and secured to said drive shaft for rotation therewith,
   d. a pair of pivoted centrifugally actuated arm members positioned at opposite sides of said sleeve member,
   e. means pivotally supporting said arm members on said sleeve member for inward pivotal movement of one of the end sections thereof toward each other when the sleeve member is rotated, each of said end sections being formed with a half nut portion, said half nut portions relatively arranged to form a split nut when said end sections are in the inwardly moved positions therefor,
   f. said actuator member comprised of a cylindrical rod having a first section guidably supported within said sleeve member for axial movement relative thereto, and a second section,
   g. said first section having a threaded portion of a length defined by rod portions of reduced diameter at opposite ends thereof, said threaded portion engageable with said split nut when said sleeve member is rotated, and
   h. means mounted on said supporting member and engageable with said second section of the rod to yieldably urge the rod in a linear direction corresponding to a position of said split nut at one or the other of said rod portions of reduced diameter, whereby one or the other of the termini of said threaded portion is yieldably held against said split nut after rotation of said threaded portion out of threaded engagement with the split nut.

4. An apparatus for providing a controlled rectilinear movement of a rotatably driven actuator member comprising:
   a. a frame structure,
   b. a reversible electric motor mounted on said frame structure having a drive shaft,
   c. centrifugally actuated clutch means secured to said drive shaft for rotation therewith including coacting nut portions,
   d. said actuator member comprised of a rod having a first section and a second section,
   e. means on said frame structure supporting said second section for rectilinear movement,
   f. said first section having a threaded portion engageable with said nut portions, said nut portions movable into engagement with said threaded portion when said drive shaft is rotated, said first section formed with a portion of reduced diameter at each end of said threaded portion whereby rectilinear movement of said rod is terminated in either direction of movement thereof on disengagement of said nut portions from said threaded portion when said nut portions are opposite one or the other of said reduced diameter rod portions, and
   f. means on said frame structure for yieldably urging said rod in a direction opposite to the direction of rectilinear movement thereof to retain the disengaged nut portions in contact with the adjacent terminal end of said threaded portion, whereby on a reversed rotation of said nut portions, said threaded portion is engageable with the nut portions to rectilinearly move said rod in a reversed direction relative to the last direction of movement thereof.

5. The apparatus according to claim 4 wherein said yieldable means includes:
   a. a cylindrical sleeve member positioned about the second section of said rod,
   b. means supporting the cylindrical sleeve on said frame structure for relative movement axially of said rod,
   c. a coil spring within said sleeve member mounted about said rod for extensible movement axially of said rod between predetermined stop portions on said rod, and
   d. means on said cylindrical sleeve member for compressing said spring relative to said stop portions in response to movement of said rod in either direction.

6. Apparatus for obtaining controlled rectilinear movement comprising: a reversible rotary driving member, a driven member, means supporting said driven member for reversible movement axially of said driving member, an intermediate centrifugally actuated member, means supporting said centrifugally actuated member on said driving member for pivoted movement about an axis extended diametrically of said driving member, and coacting portions on said intermediate member and said driven member forming a nut and screw system for releasably connecting said driving member with said driven member when said driving member is rotated, said driven member including spaced sections of reduced cross section.

7. A linear actuator comprising: an axially movable threaded member, a rotatable member, and centrifugally actuated means including threads and movably supported on said rotatable member for generally radial movement between a non-rotating at rest position with said threads disengaged from said threaded member and a rotating active position with said threads engaging said threaded member to move said threaded member axially, said threaded member including a section of reduced cross section at each end of the threaded section thereof.

8. An actuator as set forth in claim 7 including means supporting said threaded member for axial movement by said centrifugally actuated means and by other means when said centrifugally actuated means is in said non-rotating at rest position.

9. An actuator as set forth in claim 7 wherein said centrifugally actuated means includes a pair of arms pivotally attached to said rotatable member.

10. An actuator as set forth in claim 9 wherein each of said arms includes a weight portion below the pivotal attachment thereof to said rotatable member and a half nut portion above said pivotal attachment, said threads being in said nut portions of said arms.

* * * * *